(12) United States Patent
Mildner et al.

(10) Patent No.: US 8,469,129 B2
(45) Date of Patent: Jun. 25, 2013

(54) ENERGY STORAGE ARRANGEMENT IN THE FLOOR AREA OF A VEHICLE

(75) Inventors: Udo Mildner, Limburg (DE); Stefan Gloger, Muehltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/214,324

(22) Filed: Aug. 22, 2011

(65) Prior Publication Data

US 2012/0043147 A1 Feb. 23, 2012

(30) Foreign Application Priority Data

Aug. 20, 2010 (DE) .......................... 10 2010 034 925

(51) Int. Cl.
*B60R 16/04* (2006.01)
(52) U.S. Cl.
USPC ......................................................... 180/68.5
(58) Field of Classification Search
USPC ................. 180/68.1, 68.2, 68.5; 429/99, 100, 429/82, 153, 159
See application file for complete search history.

(56) References Cited

U.S. PATENT DOCUMENTS

| | | | | |
|---|---|---|---|---|
| 4,216,839 A | * | 8/1980 | Gould et al. | 180/65.1 |
| 4,339,015 A | * | 7/1982 | Fowkes et al. | 180/65.1 |
| 4,365,681 A | * | 12/1982 | Singh | 180/68.5 |
| 5,156,225 A | * | 10/1992 | Murrin | 180/65.1 |
| 5,251,721 A | * | 10/1993 | Ortenheim | 180/298 |
| 5,343,973 A | * | 9/1994 | Lanker | 180/211 |
| 5,373,910 A | * | 12/1994 | Nixon | 180/65.1 |
| 5,390,754 A | * | 2/1995 | Masuyama et al. | 180/68.5 |
| 5,534,364 A | * | 7/1996 | Watanabe et al. | 429/61 |
| 5,636,701 A | * | 6/1997 | Norman et al. | 180/68.5 |
| 5,704,644 A | * | 1/1998 | Jaggi | 280/796 |
| 5,853,058 A | * | 12/1998 | Endo et al. | 180/65.1 |
| 5,948,298 A | * | 9/1999 | Ijaz | 219/209 |
| 6,109,380 A | * | 8/2000 | Veenstra | 180/68.5 |
| 6,227,322 B1 | * | 5/2001 | Nishikawa | 180/68.5 |
| 6,230,677 B1 | * | 5/2001 | Setsuda | 123/184.21 |

(Continued)

FOREIGN PATENT DOCUMENTS

DE 9090093 U1 4/1991
DE 19708404 A1 10/1997

(Continued)

OTHER PUBLICATIONS

German Patent Office, German Search Report for Application No. 102010034925.9, dated Mar. 21, 2011.

(Continued)

*Primary Examiner* — John Walters
*Assistant Examiner* — James Triggs
(74) *Attorney, Agent, or Firm* — Ingrassia Fisher & Lorenz, P.C.

(57) ABSTRACT

An energy storage arrangement is provided in a floor area of a vehicle that includes, but is not limited to an energy storage device carrier having a floor and side walls with a fixing mechanism for fixing at least one energy storage device. An underfloor mounting plate fixes the energy storage device carrier and the energy storage device provided in said energy storage device carrier on an underfloor structure of the vehicle. A cover plate in the floor area of the vehicle covers at least the energy storage device carrier toward the vehicle interior in a media-tight manner.

12 Claims, 13 Drawing Sheets

U.S. PATENT DOCUMENTS

| | | | |
|---|---|---|---|
| 6,569,556 B2 * | 5/2003 | Zhou et al. | 429/88 |
| 7,051,825 B2 * | 5/2006 | Masui et al. | 180/68.5 |
| 7,112,387 B2 * | 9/2006 | Kimoto et al. | 429/99 |
| 7,240,752 B2 * | 7/2007 | Takahashi et al. | 180/68.1 |
| 7,610,978 B2 * | 11/2009 | Takasaki et al. | 180/68.5 |
| 7,654,351 B2 * | 2/2010 | Koike et al. | 180/68.5 |
| 7,688,582 B2 * | 3/2010 | Fukazu et al. | 361/690 |
| 7,896,115 B2 * | 3/2011 | Ono et al. | 180/65.31 |
| 7,900,728 B2 * | 3/2011 | Suzuki et al. | 180/68.5 |
| 7,905,308 B2 * | 3/2011 | Abe et al. | 180/68.5 |
| 7,913,788 B1 * | 3/2011 | Bryer et al. | 180/68.5 |
| 7,918,489 B2 * | 4/2011 | Oku et al. | 296/68.1 |
| 7,931,105 B2 * | 4/2011 | Sato et al. | 180/68.5 |
| 7,997,368 B2 * | 8/2011 | Takasaki et al. | 180/68.5 |
| 8,079,435 B2 * | 12/2011 | Takasaki et al. | 180/68.5 |
| 2003/0047366 A1 * | 3/2003 | Andrew et al. | 180/68.5 |
| 2008/0196957 A1 * | 8/2008 | Koike et al. | 180/68.5 |
| 2009/0166116 A1 * | 7/2009 | Kiya et al. | 180/68.5 |
| 2010/0307848 A1 * | 12/2010 | Hashimoto et al. | 180/68.5 |
| 2011/0297467 A1 * | 12/2011 | Iwasa et al. | 180/65.31 |
| 2011/0297470 A1 * | 12/2011 | Heichal et al. | 180/68.5 |

FOREIGN PATENT DOCUMENTS

| | | |
|---|---|---|
| DE | 10154353 A1 | 5/2002 |
| DE | 10297137 T5 | 8/2004 |
| DE | 202009004287 U1 | 6/2009 |
| EP | 2168801 A1 | 3/2010 |
| JP | 5193366 A | 8/1993 |
| JP | 2006176105 A | 7/2006 |

OTHER PUBLICATIONS

UK Intellectual Property Office, British Examination Report for Application No. 1114163.7, dated Dec. 13, 2011.

* cited by examiner

ENERGY STORAGE ARRANGEMENT IN THE FLOOR AREA OF A VEHICLE

CROSS-REFERENCE TO RELATED APPLICATION

This application claims priority to German Patent Application No. 102010034925.9, filed Aug. 20, 2010, which is incorporated herein by reference in its entirety.

TECHNICAL FIELD

The technical field relates to an energy storage arrangement in a floor area of a vehicle comprising an energy storage device carrier having a floor and side walls. A cover plate in the floor area covers the energy storage device carrier toward the vehicle interior.

BACKGROUND

An energy storage arrangement is known from the document DE 101 54 353 for a modular vehicle structure. This modular vehicle structure comprises a vehicle body and a vehicle chassis coupled to the vehicle body, with the vehicle chassis comprising a frame, a shell coupled to the frame, which provides a storage device for a power source for driving a drive system, and a cover for covering the shell, with the result that the power source is enclosed by the shell and the cover.

It is at least one object to provide an energy storage arrangement which is suitable for installation in the known modular vehicle structure, where the energy storage arrangement is also intended to supply conventional auxiliary power units of the vehicle such as, for example, a starter motor for a conventional internal combustion engine. In addition, other objects, desirable features and characteristics will become apparent from the subsequent summary and detailed description, and the appended claims, taken in conjunction with the accompanying drawings and this background.

SUMMARY an energy storage arrangement is provided in a floor area of a vehicle comprising an energy storage device carrier having a floor and side walls with fixing means for fixing at least one energy storage device. A cover plate in the floor area of the vehicle covers the energy storage device carrier toward the vehicle interior. An underfloor mounting plate fixes the energy storage device carrier and the energy storage device provided in said energy storage device carrier on an underfloor structure of the vehicle.

Such an energy storage arrangement has the advantage that in principle, it can be disposed under one of the front seats and in the case of larger energy storage units, can be positioned under all three items of seating accommodation. The crucial thing here is that the cover can be a multifunctional cover, which not only seals an energy storage device carrier in a media-tight manner but at the same time, other regions, which for example comprise a controller or form air ducts, can be closed in a media-tight manner by the cover plate in a single assembly process.

On the other hand, it is also possible that the energy storage device carrier already has fixing means for a controller so that the energy storage device carrier sealed in a media-proof manner by the cover plate can be used not only for the energy storage device itself but also for other components, which should be sealed in a media-tight manner with respect to the vehicle interior.

It is furthermore provided that the energy storage device carrier has fixing means for a cable distributor. To this end, an opening can be provided in the energy storage device carrier, which however does not lead into the interior of the vehicle but remains in the underfloor region of the vehicle so that a venting of the energy storage device carrier toward the vehicle surroundings is simultaneously possible with the opening for a cable distributor.

In a further embodiment, it is provided that at least one duct of a footwell ventilation system is disposed integrally on a side wall of the energy storage device carrier. This has the advantage that the cover plate can be made larger than the energy storage device carrier and can seal such a duct toward the top.

It is also advantageous if, on both sides of the energy storage device carrier, the cover plate seals corresponding footwell ventilation ducts toward the rear area of the vehicle in a media-tight manner so that both the energy storage device carrier and the lateral ducts of a footwell ventilation system of a rear area of the vehicle are covered in a media-tight manner. The footwell ventilation ducts provided integrally with the energy storage device carrier result in a saving of space and assembly costs compared with separately installed and disposed ventilation ducts for the rear area of the vehicle.

It is furthermore provided that the energy storage device carrier comprises an energy storage device carrier base having a molded, media-tight, trough-shaped recess. This trough-shaped recess has the advantage that it is adapted to the size of an energy storage device foot and forms a firm seat for this energy storage device carrier foot and therefore for the energy storage device. In addition, such a recess has the advantage that it can collect chemicals if such chemicals should be released from the energy storage device.

It is furthermore provided that the energy storage device carrier has a ventilation opening which is disposed above the trough-shaped recess of the energy storage device carrier base. This has the advantage that the trough-shaped recess can be used to collect chemicals without such chemicals being able to escape from the energy storage device carrier via the provided ventilation opening. Such a ventilation opening, which is disposed above the trough-shaped recess, makes a connection to the outer area of the vehicle and is not connected to the vehicle interior.

In a further embodiment, the fixing means is a clamping holder having a ribbed structure and comprises a depression in the trough-shaped recess of the energy storage device carrier base. At the same time, it is provided that the entire energy storage device carrier is formed of plastic and manages without molded threaded holes, by which means an energy storage device foot is usually fixed on the floor of a vehicle. On the contrary, a reinforcing plastic rib structure is provided, where the energy storage device foot can be pivoted into the fixing means between the clamping holder of the rib structure and an edge of a depression as a pivot axis for the energy storage device foot. The subsequent application of the cover ensures that the energy storage device or a battery remains fixed in the energy storage device carrier.

It is furthermore provided that the energy storage arrangement is disposed between an outer longitudinal member and a tunnel edge profile of a central tunnel of a vehicle body. These three delimiting members or profiles form the underfloor structure between which the energy storage device is fixed in the energy storage device carrier, where the underfloor mounting plate can be fixed detachably on the members or the profiles.

In a further embodiment, it is provided that the energy storage arrangement is disposed under one of the front seats of the vehicle, especially as this space is sufficient to accommodate a vehicle battery in the form of a lead rechargeable battery or in the form of lithium ion cells. If larger energy storage units are required for an electric drive of a vehicle, a corresponding energy storage arrangement can also be provided under the second front seat of the vehicle or under the rear bench seat of the vehicle. If such an energy storage arrangement is merely disposed under one of the front seats of the vehicle, the underfloor mounting plate can be fixed on the outer longitudinal member and the inner edge profile of the central tunnel of the vehicle body.

In order to insert a vehicle battery or an energy storage device into the energy storage arrangement from the interior, it is provided that the cover plate can be fixed by means of quick release fasteners on the energy storage device carrier in a media-tight manner and can be rapidly dismounted. Consequently, only the quick release fasteners of the cover plate must be released if it is necessary to change the battery or charge the battery.

It is also provided that a charging cable connection is disposed in the engine compartment, which is connected via connecting cable and a cable opening in the energy storage device carrier to the connecting electrodes of the energy storage device. This has the advantage that for external charging and/or for bridging the battery when starting up the vehicle, it is not necessary to remove the front seat and remove the cover plate to reach the electrodes of the battery. On the contrary, it is sufficient to open the hood and connect the charging cable connections provided there to the charger and/or to the auxiliary power source by means of bridging cables. In order to nevertheless achieve a stable seat function for the vehicle seats, seat fixings for the vehicle seats are provided on both sides of the cover plate.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
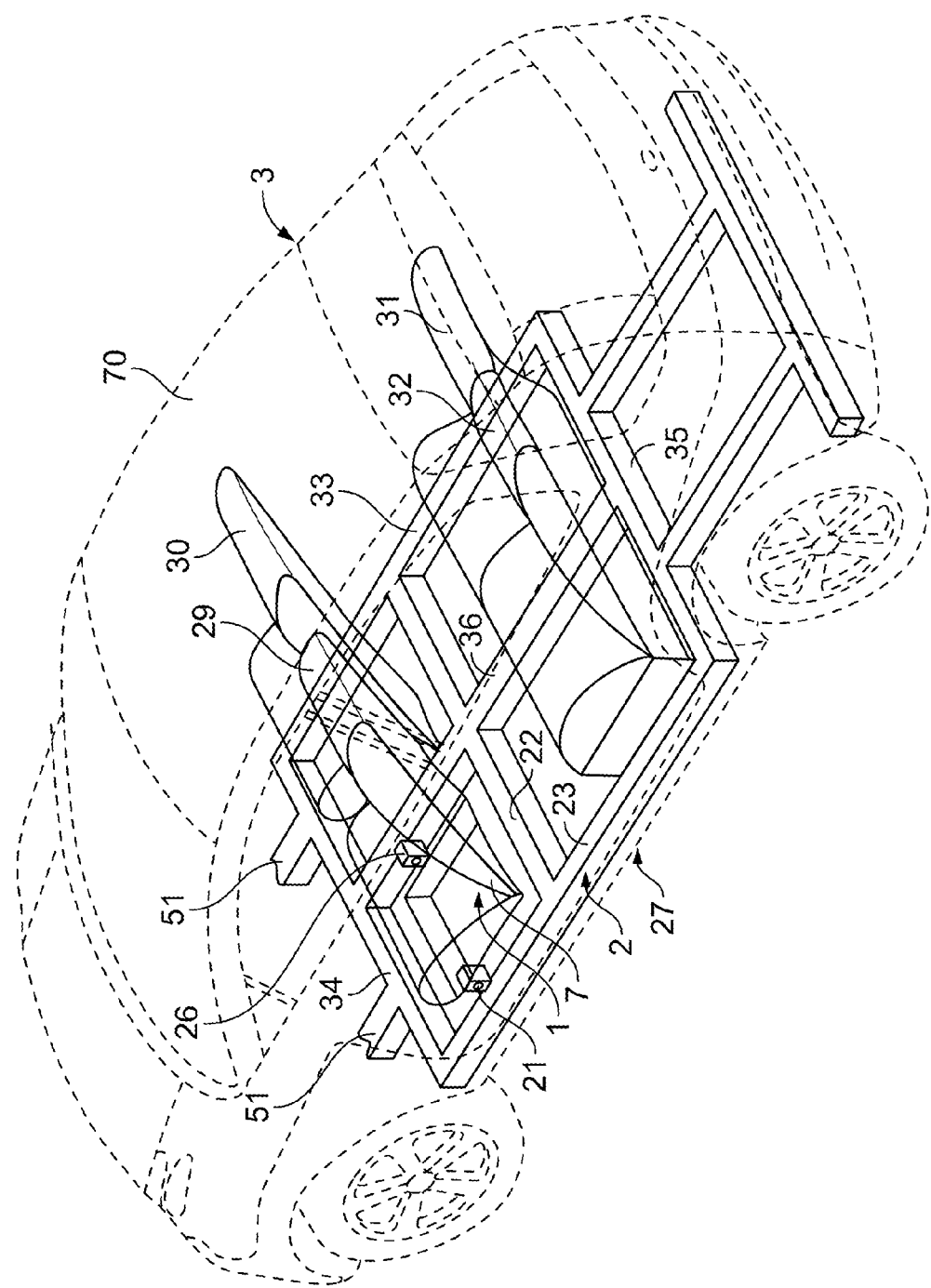
FIG. 1 shows a schematic diagram of a vehicle with a position for an energy storage arrangement according to one embodiment.

FIG. 1 shows a schematic diagram of a vehicle 3 with a position for an energy storage arrangement 1 according to one embodiment of the application. To this end, a recess is provided in the floor area 2 of the vehicle 3 below the driver's seat 29, in which the energy storage arrangement 1 is disposed. An underfloor mounting plate 7 is provided for the energy storage arrangement 1, which carries the various components of the energy storage arrangement 1 between the lateral seat fixings 26 of the driver's seat 29 in the interior 70 of the vehicle 3.

This underfloor mounting plate 7 is disposed on the underside 27 of the vehicle 3, in the region of the driver's seat 29 in this embodiment. It can, however, also be disposed under the passenger seat 30 or under the rear seats 31 and 32 between the vehicle longitudinal members 23 and 33, a central tunnel 36, and between a front transverse member 34 and a rear transverse member 35. All the accommodation possibilities of the floor area 2 of the vehicle 3 can be used for a correspondingly high storage capacity. Accommodation in the floor area primarily has the advantage that the center of gravity of the vehicle is lower than in the previous arrangements of energy storage arrangements, with the result that the road holding and the driving dynamics are improved.

Figure 2:
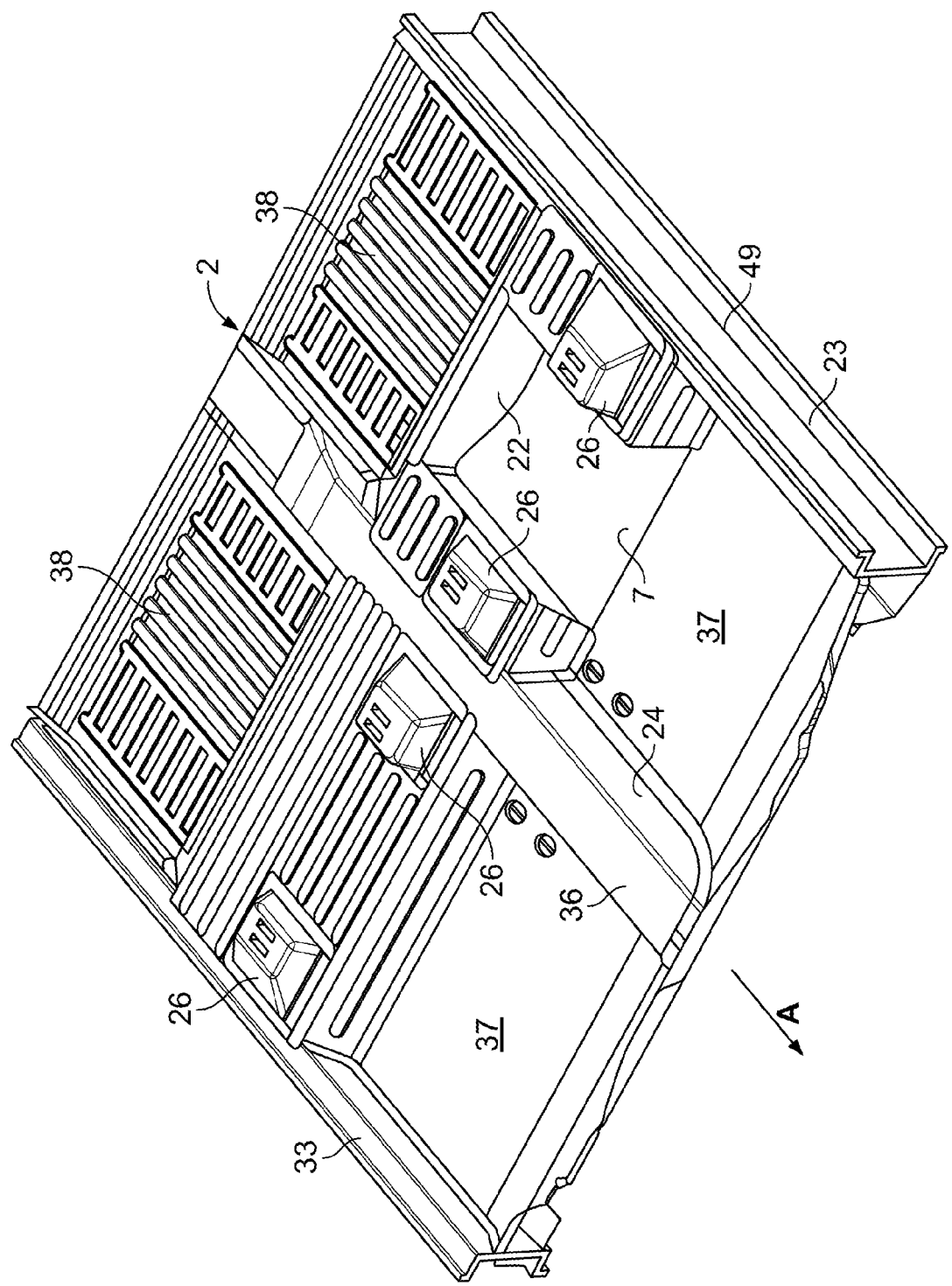
FIG. 2 shows a schematic, perspective plan view of a floor area of the vehicle with the position for the energy storage arrangement according to FIG. 1.

FIG. 2 to FIG. 9 shows the gradual installation of components of the energy storage arrangement 1 in the floor area 2 of the vehicle 3. To this end, FIG. 2 shows a schematic, perspective plan view of the floor area 2 of the vehicle with the position for the energy storage arrangement 1 according to FIG. 1. The front floor panels 37 for driver and passenger and the rear floor panels 38 as well as the interposed seat fixings 26 can be seen in FIG. 2. In addition, a recess is provided between the seat fixings 26 of the driver's seat, which is terminated by an underfloor mounting plate 7 in the floor area 2. This underfloor mounting plate 7 is part of the energy storage arrangement and enables an energy storage device in the form of a battery to be installed under the driver's seat 29. For this purpose, the underfloor mounting plate 7 can be fixed on a transverse member 22 and/or between an inner sill structure 49 of an outer longitudinal member 23 and a tunnel edge profile 24 of a central tunnel 36. The direction of travel of the vehicle is indicated in this and the following figs. using an arrow direction A.

Figure 3:
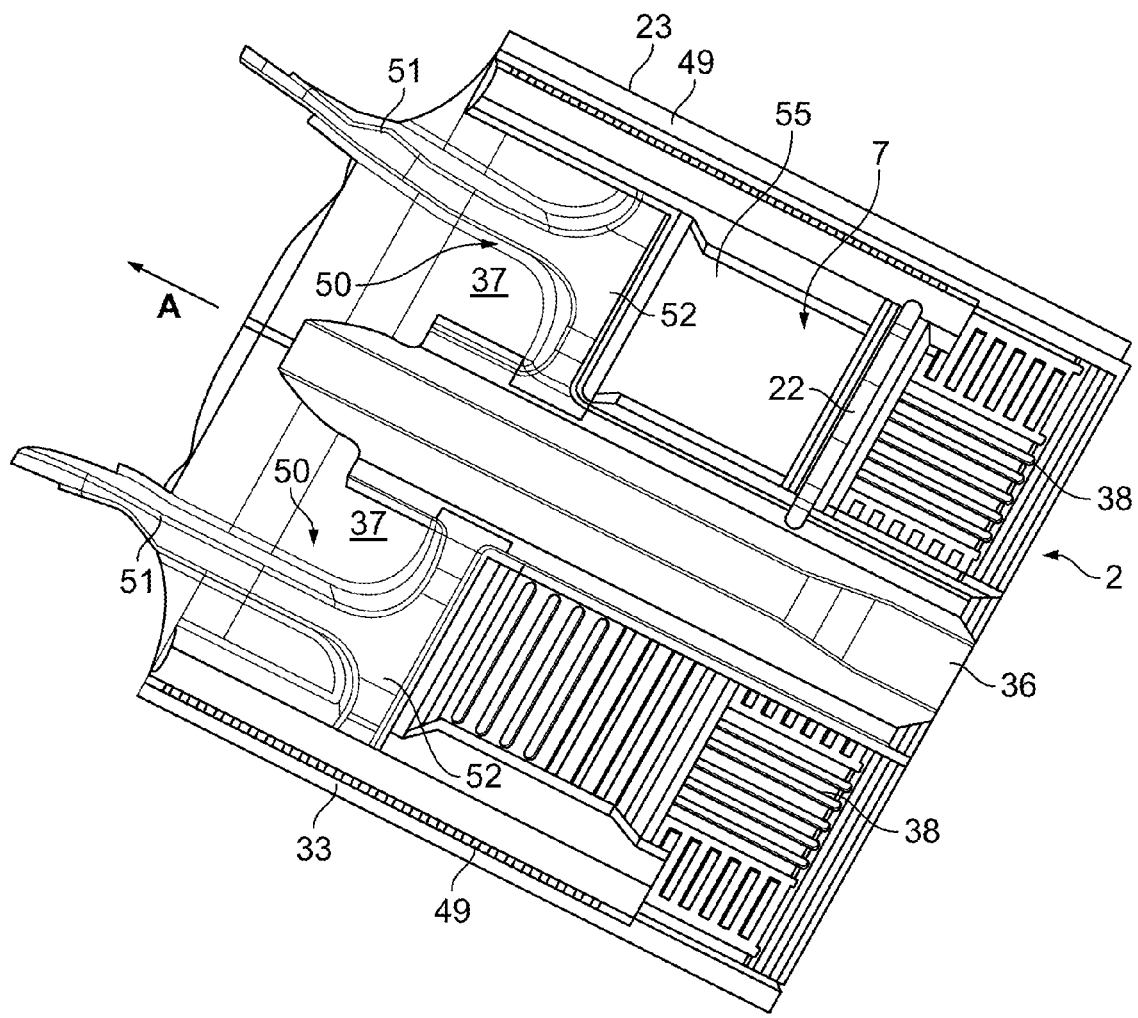
FIG. 3 shows a schematic perspective view from below of the floor area according to FIG. 2.

FIG. 3 shows a schematic perspective view from below of the floor area 2 according to FIG. 2. In the view of the floor from below the underfloor mounting plate 7 again covers an opening 55 for receiving an energy storage device under the driver's seat. Furthermore, the front floor panels 37 and the rear floor panels 38 can be seen in FIG. 3. The front floor panels 37 are supported by a front frame 50, which comprises front-frame longitudinal members 51 and transverse reinforcements 52. FIG. 3 further shows the inner sill structures 49 of the longitudinal members 23 and 33 as well as the central tunnel 36.

Figure 4:
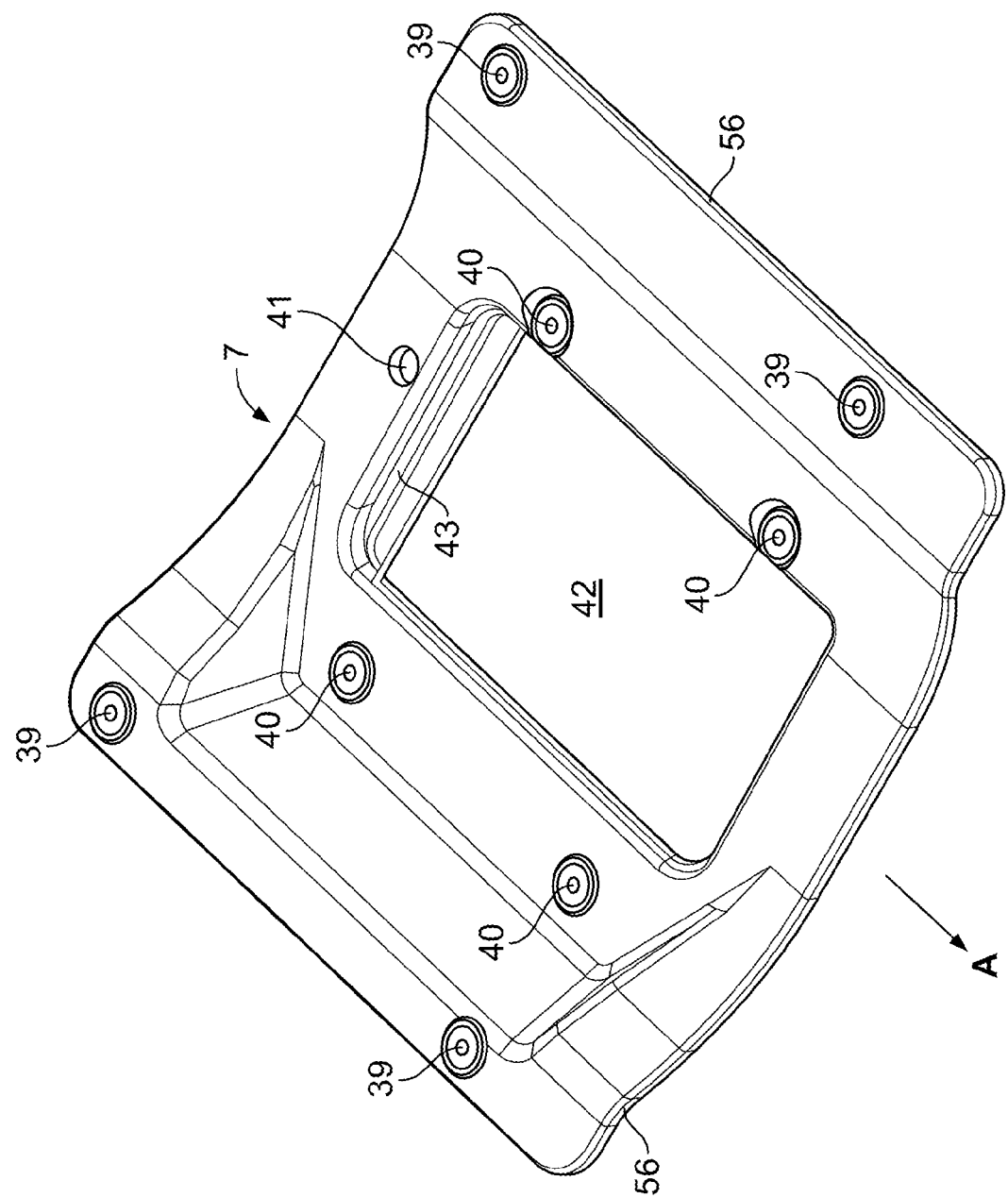
FIG. 4 shows a schematic, perspective plan view of an underfloor mounting plate for the energy storage arrangement of the vehicle according to FIG. 1.

FIG. 4 shows a schematic, perspective plan view of an underfloor mounting plate 7 for the energy storage arrangement of the vehicle 3 according to FIG. 1. This plan view shows mounting holes 39 for fastening the underfloor mounting plate 7 to a body structure. Furthermore, mounting holes 40 are provided for fastening an energy storage device carrier on the underfloor mounting plate 7. Further, a through-hole 41 for a venting opening for the energy storage device can be seen in the underfloor mounting plate 7. In addition, an impression 42 can be seen in the area of an energy storage device stamped-on surface. The underfloor mounting plate 7 also has an impression 43 for ease of movement of the energy storage device carrier. The underfloor mounting plate 7 further has a peripheral seal 56 made of EPDM along a contact surface to the body structure, which seal is applied before assembly. This seal is intended to prevent the penetration of impurities and of moisture into the interior of the vehicle.

Figure 5:
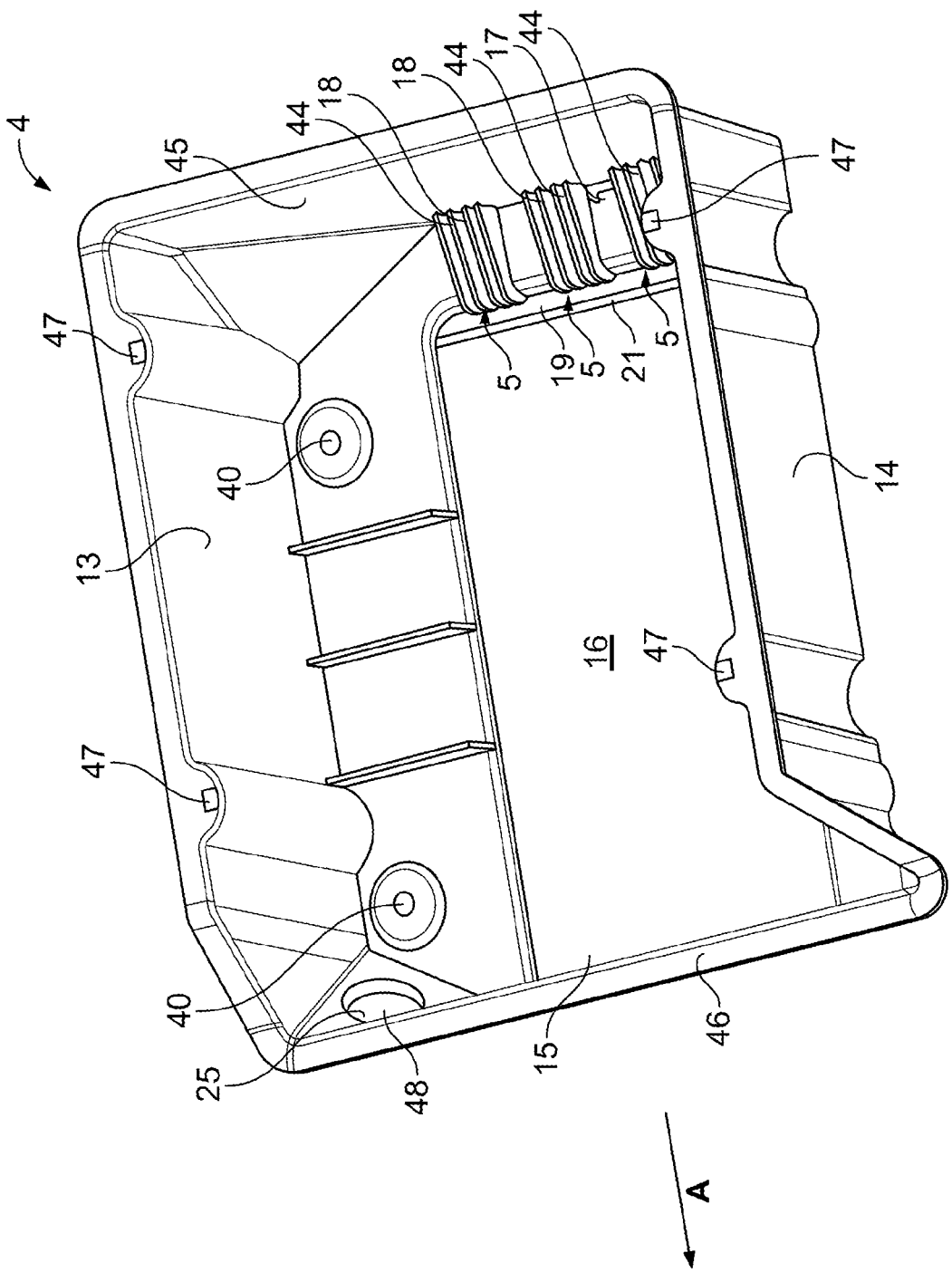
FIG. 5 shows a schematic, perspective plan view of an energy storage device carrier of the energy storage arrangement according to the embodiment.

FIG. 5 shows a schematic, perspective plan view of an energy storage device carrier 4 of the energy storage arrangement according to the embodiment. This energy storage device carrier 4 is intended to receive and fix an energy storage device in a trough-shaped recess 16. To this end on one edge 21, the energy storage device carrier 4 has an imprinted depression 19 in the trough-shaped recess 16, into which a foot of an energy storage device can be slid. The foot of the energy storage device is then clamped under clamping feet 44 as fixing means 5 of the energy storage device carrier 4. The clamping feet 44 have a ribbed structure 18 reinforcing the plastic material of the energy storage device carrier 4.

The depression 19 imprinted in the recess 16 is therefore used for a rapid mounting and dismounting of the energy storage device from the interior of the vehicle into the energy storage device carrier 4. For swiveling-in or tilting the energy storage device, sufficient space is provided between the trough-shaped recess 16 and the side walls 13 and 14 surrounding the trough-shaped recess 16 as well as the rear wall 45 and the front wall 46 of the energy storage device carrier 4.

Fixing holes 40 for fastening on the underfloor mounting plate are provided in the floor area of the energy storage device carrier 4. In addition, fixing holes 47 are provided in the side walls 13 and 14 for fastening a first plastic frame, which integrates lower duct halves of footwell ventilation ducts into the energy storage arrangement. Finally, the energy storage device carrier 4 has a through-hole 48 as a cable opening for electric cables and in addition, ventilation opening 17, which is connected to the through-hole 41 of the underfloor plate 7. The energy storage device carrier base 15 is formed in such a manner that it can be aligned and fixed using the mounting holes 40 shown in FIG. 4 and onto the impressions 42 and 43 shown there.

Figure 6:
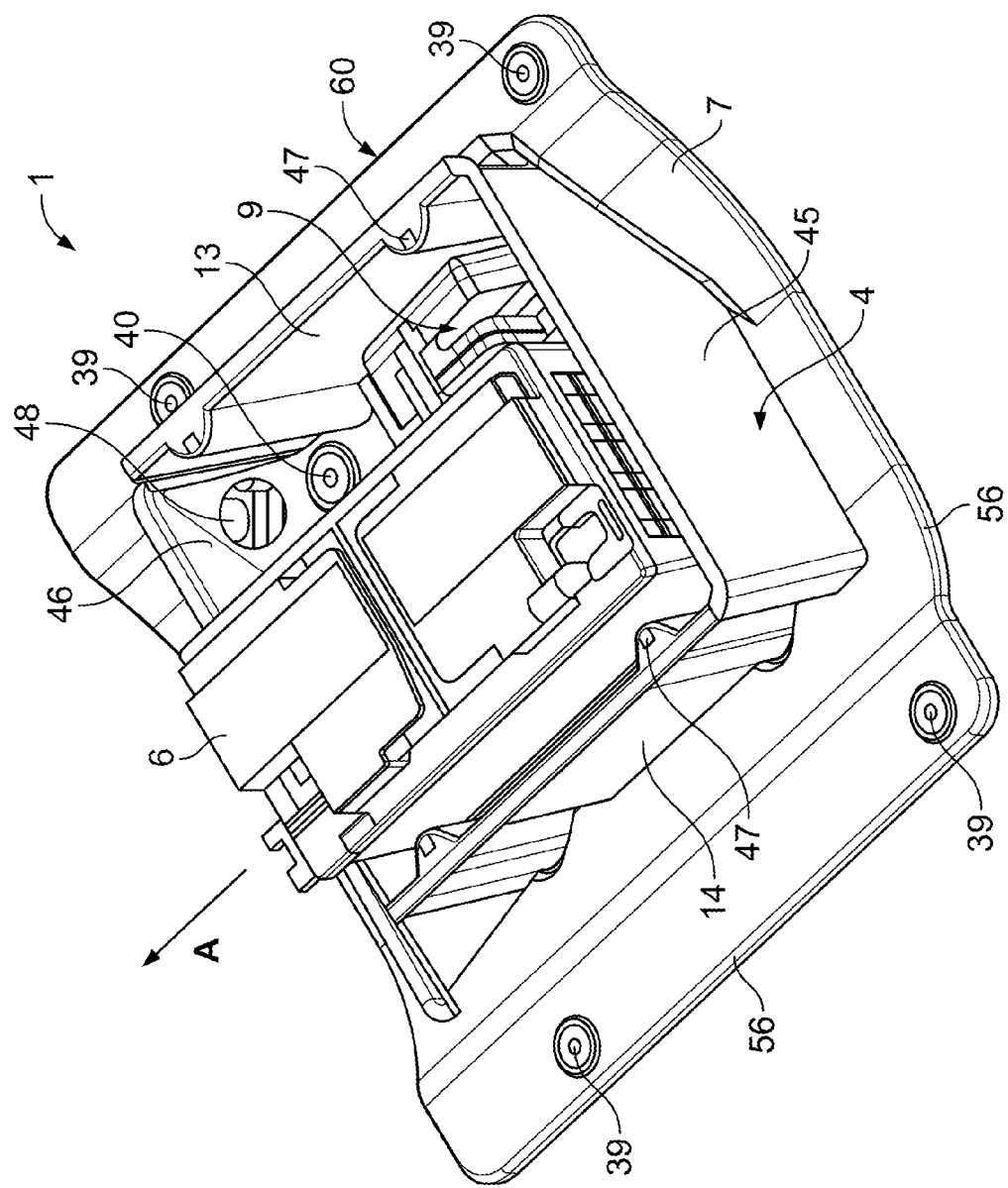
FIG. 6 shows a schematic, perspective plan view of an energy storage device according to the embodiment.

FIG. 6 shows a schematic, perspective plan view of an energy storage device 6 according to the embodiment. This energy storage device 6 is disposed together with a controller 9 and corresponding pulse distributors in an energy storage device carrier 4, which accommodates the energy storage device 6 in the form of a lithium ion battery or a lead rechargeable battery. The side walls 13 and 14 as well as the rear wall 45 and the front wall 46 thereby surround the energy storage device 6. In addition, the cable through-hole 48 can be seen in the drawing in the energy storage device carrier 4 as well as one of the mounting holes 40 for fastening the energy storage device carrier 4 (e.g., a battery carrier) on the underfloor mounting plate 7. This complete energy storage module 60 comprising the mounting plate 7, the energy storage device carrier 4, and the energy storage device 6 with controller can be mounted from the underside of the vehicle, where only the cable guidance through the through-hole 48 for electric cable needs to be pulled in.

Figure 7:
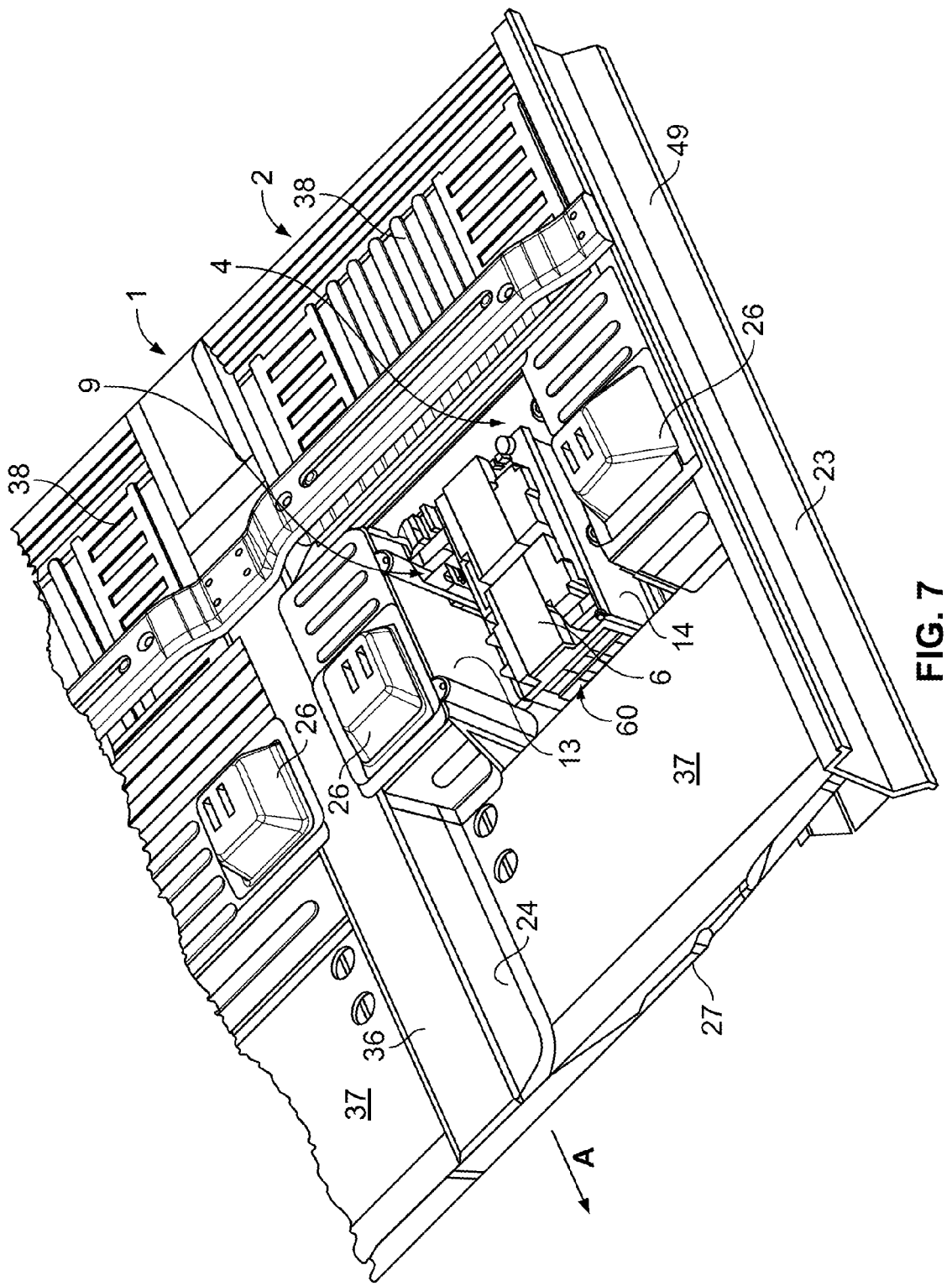
FIG. 7 shows a schematic, perspective plan view of a floor area with built-in energy storage device according to the embodiment.

FIG. 7 shows a schematic, perspective plan view of a floor area 2 with built-in energy storage device 6 according to the embodiment, which is mounted together with the underfloor plate and the energy storage device carrier 4 as energy storage module 60 from the underside 27 of the vehicle. Since this underfloor mounting plate 7 shown in FIG. 7 completely seals the floor area 2 by the peripheral seal, maintenance and exchange of the battery can be accomplished from the interior of the vehicle by folding back or dismounting the driver's seat and swiveling out the energy storage device 6 from the fixing of the energy storage device carrier shown above.

Figure 8:
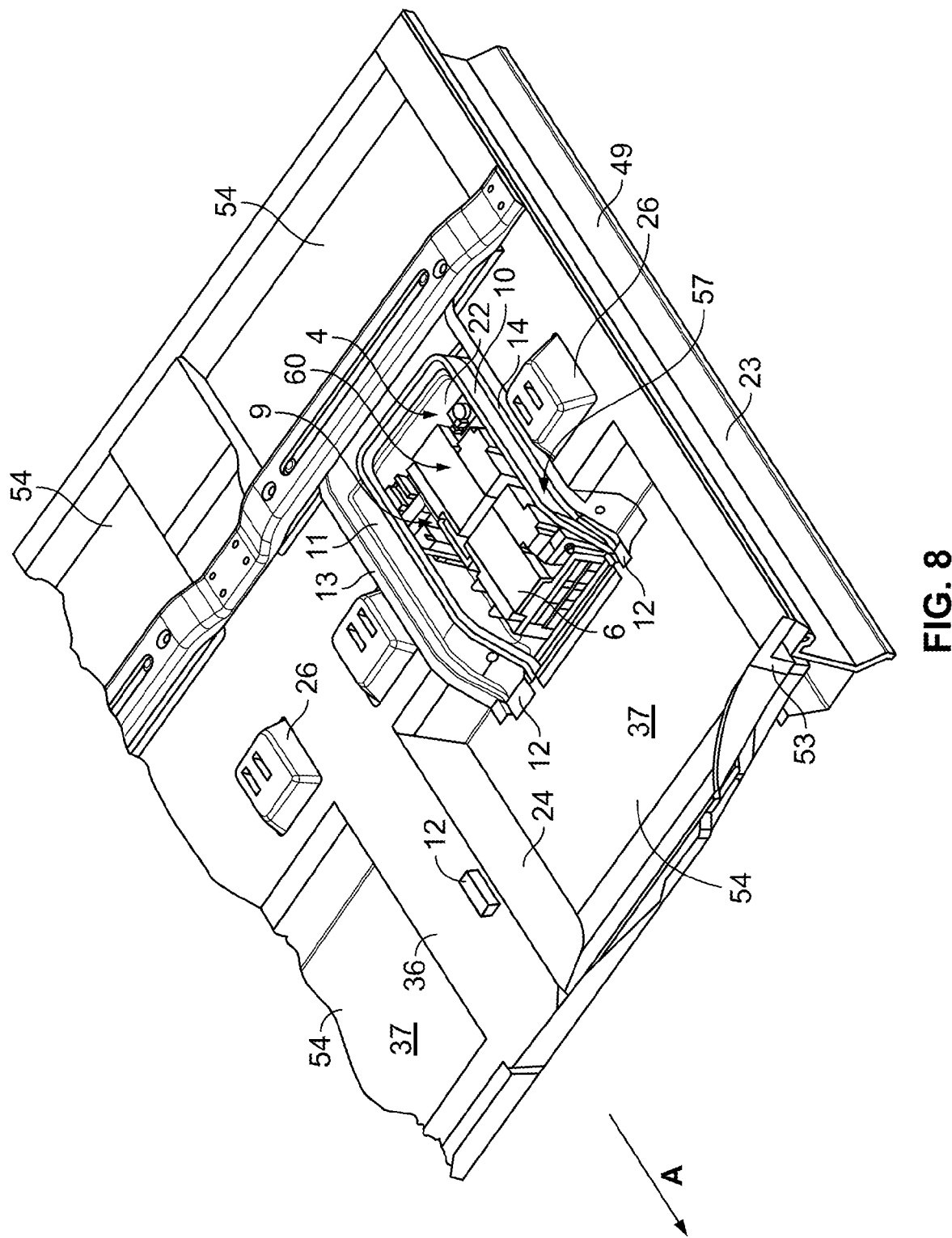
FIG. 8 shows a schematic, perspective plan view of the floor area with a covering of the floor area with insulation and carpets and with open ducts of a footwell ventilation system which is integrated in the energy storage arrangement.

FIG. 8 shows a schematic, perspective plan view of the floor area 2 after covering the floor area 2 with insulation 53 and carpets 54 and with open ducts 10 and 11 of a footwell ventilation system 12, which is integrated in the energy storage arrangement. The installation of lower duct regions 10 and 11 to extend the footwell ventilation system 12 from the front floor panels 37 to the rear floor panels 38 is accomplished with the aid of a first plastic frame 57, which is fixed on the side walls 13 and 14 of the energy storage device carrier 4 onto the fixing holes 47 shown in FIG. 5.

Figure 9:
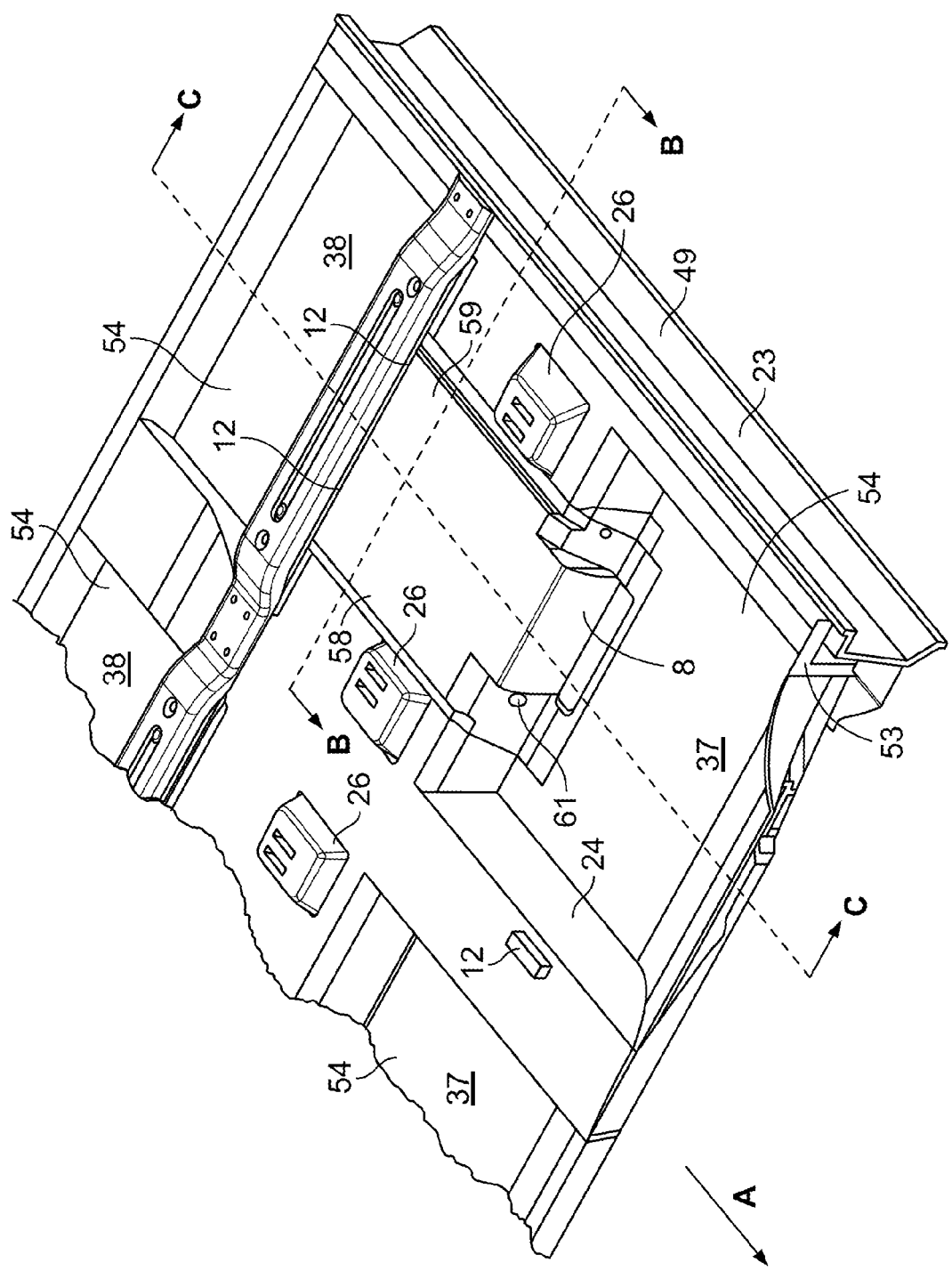
FIG. 9 shows a schematic, perspective plan view of the floor area after application of a cover of the energy storage arrangement with integral cover for the footwell ventilation system.

FIG. 9 shows a schematic, perspective plan view of the floor area 2 after attaching a cover plate 8 of the energy storage arrangement 1 with integral cover for the footwell ventilation system 12. In this case, the cover plate 8 not only covers the energy storage device carrier shown in the preceding figures, completely and in an airtight manner, but all the upper duct regions 58 and 59 of the footwell ventilation system 12 for the rear area of the vehicle. The cover plate 8 of the energy storage arrangement with integrated footwell ventilation ducts is applied to the battery storage device carrier with the aid of quick release fastener systems 61, as can be seen in the preceding figures.

Figure 10:
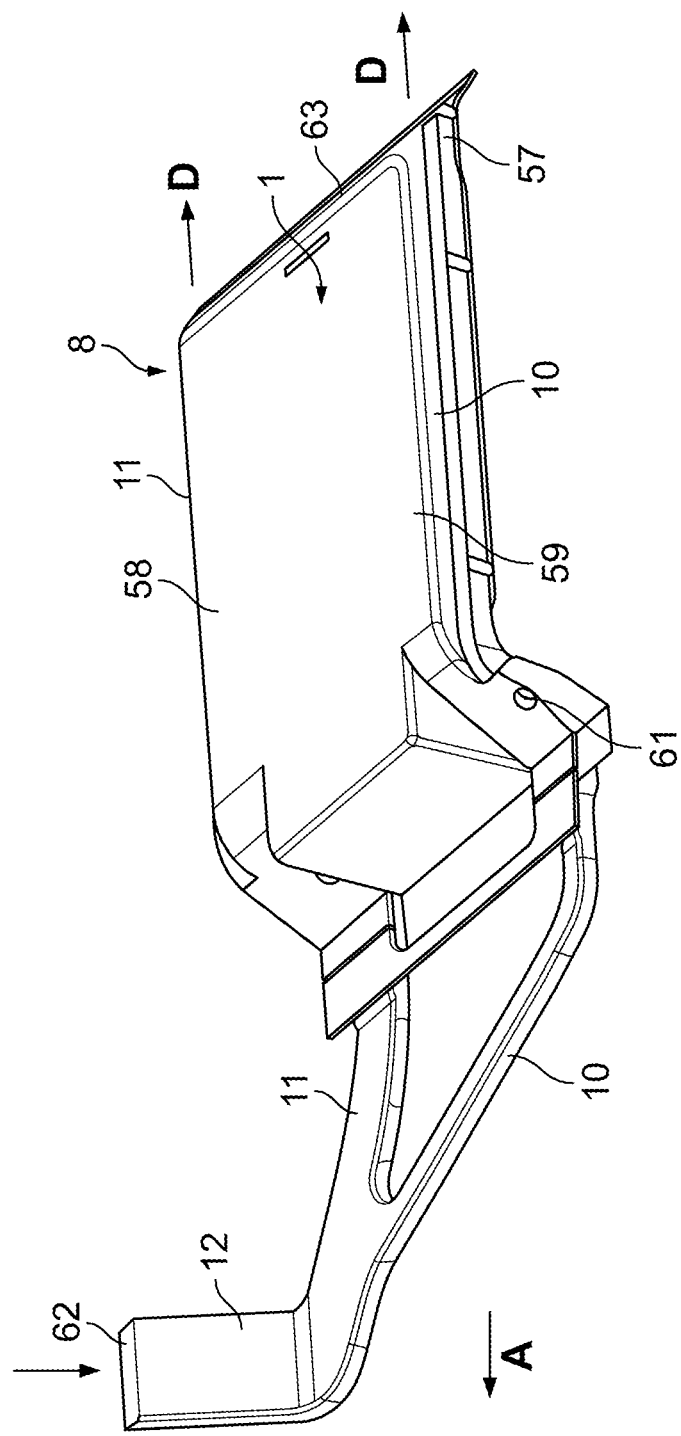
FIG. 10 shows a schematic, perspective plan view of the footwell ventilation system as a partial area of the energy storage arrangement.

FIG. 10 shows a schematic, perspective plan view of the footwell ventilation system 12 as a partial area of the energy storage arrangement. Air is guided via an air inlet opening 62 into the footwell ventilation ducts 10 and 11 of a first lower plastic frame 57, which are integrated with the energy storage arrangement 1, and a second plastic frame disposed there above, which is an integral component of the cover plate 8, and is let out in the rear area in the direction of the arrow D from an air outlet 63 for the footwell ventilation system. The cover plate 8 at the same time comprises upper duct halves 58 and 59, which are integrated in the cover plate 8.

Figure 11:
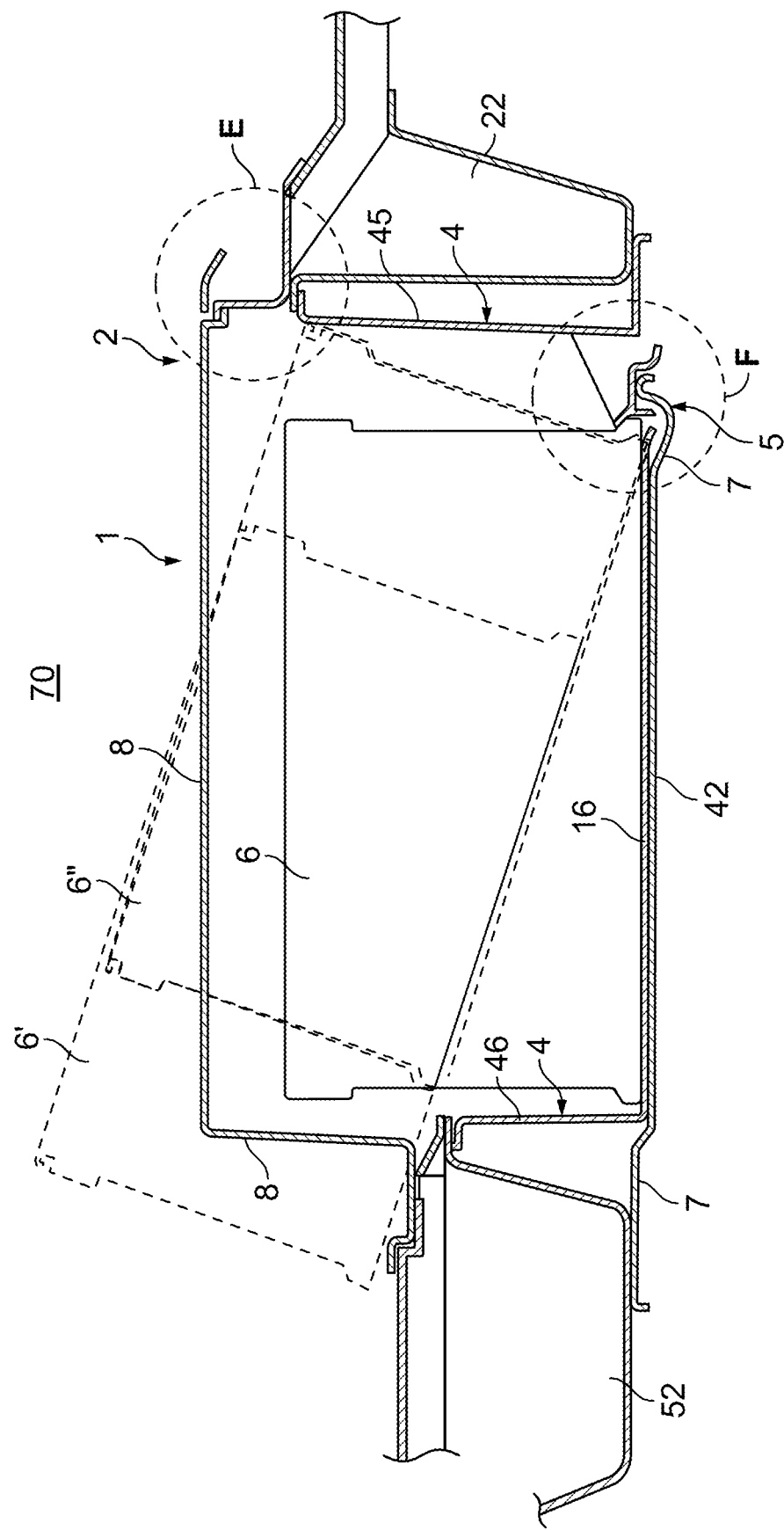
FIG. 11 shows a schematic longitudinal section through the floor area of the vehicle with fixing possibilities for the energy storage device.

FIG. 11 shows a schematic longitudinal section along the line of intersection C-C in FIG. 9 through the floor area of the vehicle with fixing possibilities for the energy storage device 6. To this end, the energy storage device 6 can both be inserted into the energy storage device carrier 4 and removed from this again from the vehicle interior 70. The dashed lines characterize the contour of an energy storage device 6 in the form of a lithium ion battery which, after raising the cover plate 8 of the energy storage arrangement 1, can be inserted at a tilt angle into the energy storage device carrier 4 over the front wall 46. In so doing, the energy storage device 6 initially adopts the position 6' and then the position 6". In the end position 6 the energy storage device 6 is inserted in the trough-shaped recess 16 in the floor area of the energy storage device carrier 4 and clamped with its energy storage device foot 20 under the fixing means 5 and thereby fixed. In the following figures the insertion of the battery from the inner area 70 of the vehicle is shown in detail with the aid of the details E and F.

Figure 12:
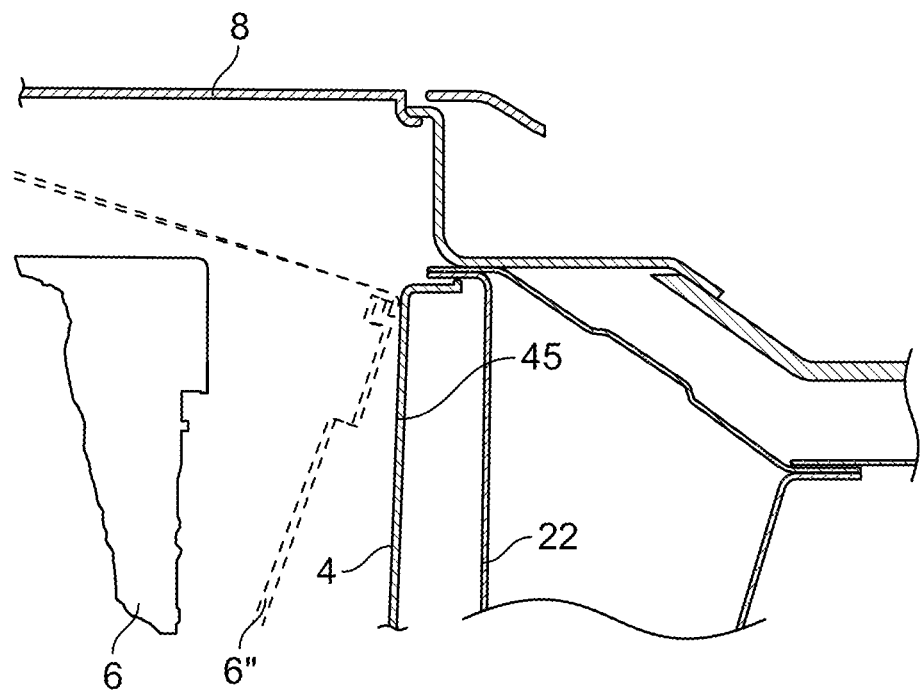
FIG. 12 shows a schematic longitudinal section through a section E in FIG. 11.

FIG. 12 shows a schematic longitudinal section through a section E in FIG. 11, whereby it is shown that there is a sufficient distance from the rear wall 45 of the energy storage device carrier 4 to the end position of the energy storage device 6 to allow a position 6" when inserting the energy storage device 6 into the energy storage device carrier 4, which enables the energy storage device 6 to be introduced into its end position from the vehicle interior.

Figure 13:
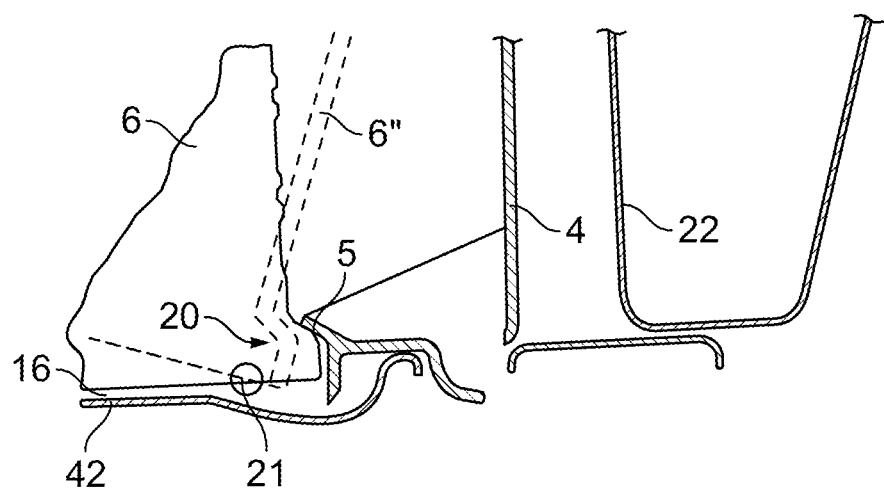
FIG. 13 shows a schematic longitudinal section through a section F in FIG. 11.

FIG. 13 shows a schematic longitudinal section through a section F in FIG. 11. It is hereby shown that the edge 21 of the depression in the trough-shaped recess 16 serves as a pivot axis for the energy storage device foot 20, in order to clamp this under the fixing means 5.

Figure 14:
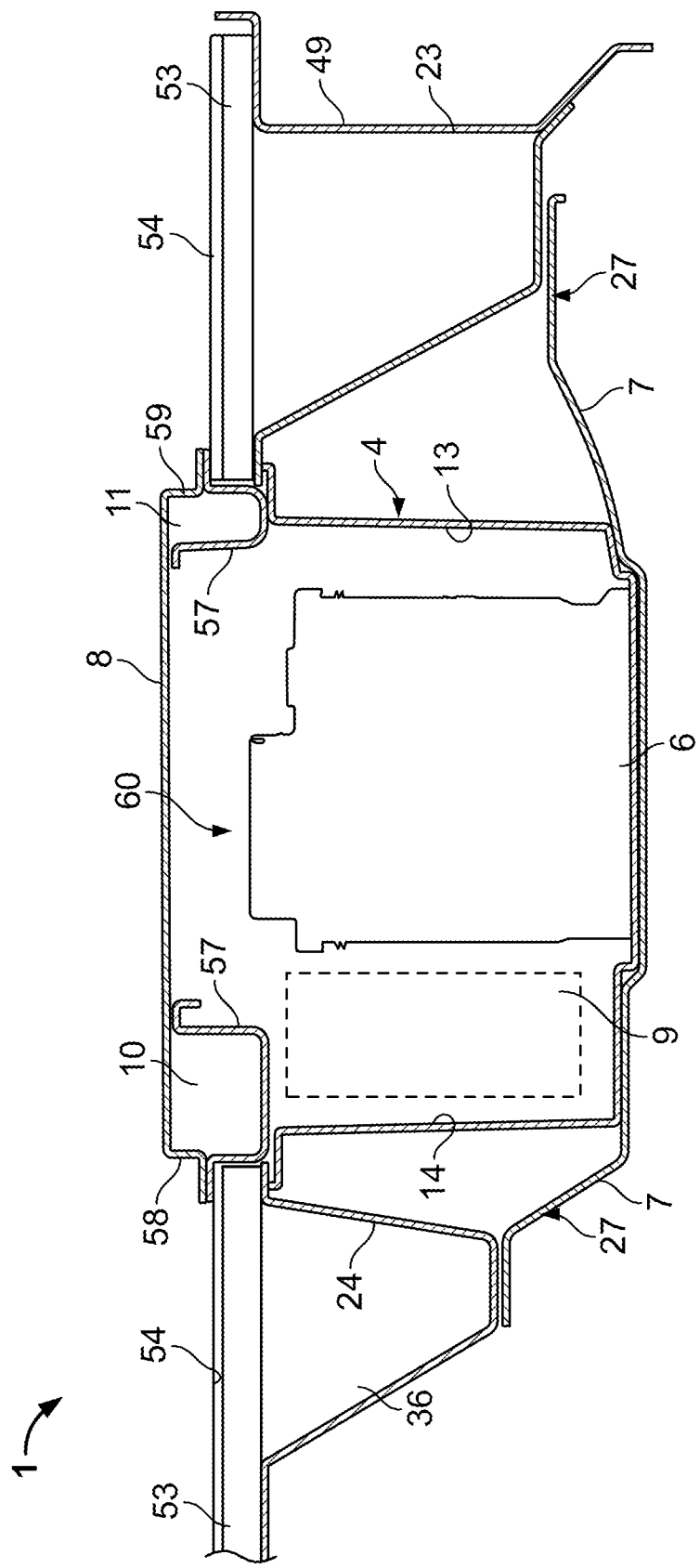
FIG. 14 shows a schematic cross-section through the floor area with mounted energy storage arrangement.

FIG. 14 shows a schematic cross-section along the line of intersection B-B in FIG. 9 through the floor area of the vehicle with mounted energy storage arrangement 1. The dashed line marks the position of a controller 9 with pulse distributor. Furthermore, this cross-section shows that the cover plate 8 integrally forms the upper area of the footwell ventilation ducts 10 and 11, with the footwell ventilation ducts 10 and 11 being fixed with a first plastic frame 57 on the energy storage device carrier 4. In addition, FIG. 14 shows the arrangement of insulation 53 and carpets 54 on the one hand on the central tunnel 36 and on the other hand, as far as an outer longitudinal member 23 and its sill structure 49. The contour of the underfloor mounting plate 7, by which means the energy storage module 60 can be mounted from the underside 27 of the vehicle, can also be clearly identified.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An energy storage arrangement in a floor area of a vehicle, comprising:
    an energy storage device carrier having a floor and side walls with a fixing mechanism configured to fix at least one energy storage device;
    a cover plate in the floor area configured to cover at least the energy storage device carrier toward a vehicle interior; and
    an underfloor mounting plate configured to receive and fix the energy storage device carrier and the energy storage device provided in said energy storage device carrier,
    wherein the energy storage device carrier comprises an energy storage device carrier base having a molded, media-tight, and trough-shaped recess,
    wherein the fixing mechanism comprises a clamping holder having a ribbed structure and a depression in the trough-shaped recess of the energy storage device carrier base, and
    wherein an energy storage device foot is configured to pivot into the fixing mechanism between the clamping holder and an edge of the depression as a pivot axis for the energy storage device foot.

2. The energy storage arrangement according to claim 1, further comprising
    a seat fixing for a vehicle seat disposed on both sides of the cover plate.

3. The energy storage arrangement according to claim 1, wherein the energy storage device carrier further comprises a second fixing mechanism for a controller.

4. The energy storage arrangement according to claim 1, wherein the energy storage device carrier further comprises a second fixing mechanism for a cable distributor.

5. The energy storage arrangement according to claim 4, wherein at least one duct of a footwell ventilation system is disposed integrally on a side wall of the energy storage device carrier.

6. The energy storage arrangement according to claim 5, wherein the cover plate covers both the energy storage device carrier and also the at least one duct of the footwell ventilation system in a media-tight manner.

7. The energy storage arrangement according to claim 1, wherein the energy storage device carrier has a ventilation opening above the trough-shaped recess of the energy storage device carrier base.

8. The energy storage arrangement according to claim 1, wherein the energy storage arrangement is disposed between a rear transverse member, an outer longitudinal member and a tunnel edge profile of a central tunnel of a vehicle body.

9. The energy storage arrangement according to claim 1, wherein the energy storage arrangement is disposed under a front seat of the vehicle.

10. The energy storage arrangement according to claim 1, wherein the underfloor mounting plate is fixed on the outer longitudinal member and the tunnel edge profile of the central tunnel of the vehicle body.

11. The energy storage arrangement according to claim 1 wherein the cover plate is configured for fixing with release fasteners on the energy storage device carrier in a media-tight manner.

12. The energy storage arrangement according to claim 1, wherein charging cable connections are disposed in the engine compartment, which are connected via connecting cable and a cable opening in the energy storage device carrier to the connecting electrodes of the energy storage device.

* * * * *